United States Patent
Strikis et al.

(10) Patent No.: US 6,494,930 B2
(45) Date of Patent: Dec. 17, 2002

(54) OIL SEPARATOR HAVING A TORTUOUS PATH DISPOSED BETWEEN AN INLET AND FIRST OUTLET

(75) Inventors: Guntis Viktors Strikis, Belleville, MI (US); Kanwal Bhatia, Troy, MI (US); Lavlesh Sud, Farmington Hills, MI (US); Mirza Mahmood Baig, Inkster, MI (US); Vipen Khetarpal, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/817,332

(22) Filed: Mar. 26, 2001

(65) Prior Publication Data

US 2002/0134062 A1 Sep. 26, 2002

(51) Int. Cl.$^7$ .......................... B01D 45/06; B01D 45/08
(52) U.S. Cl. .................. 55/462; 55/465; 96/190
(58) Field of Search .................. 55/462, 464, 465; 96/188, 189, 190

(56) References Cited

U.S. PATENT DOCUMENTS

| | | | | |
|---|---|---|---|---|
| 512,681 | A | * | 1/1894 | Clute ........................ 55/446 |
| 2,894,599 | A | * | 7/1959 | Leininger .................... 55/325 |
| 4,996,841 | A | | 3/1991 | Meijer et al. |
| 5,036,679 | A | | 8/1991 | Zlobinsky et al. |
| 5,816,134 | A | | 10/1998 | Takenaka et al. |
| 5,921,756 | A | | 7/1999 | Matsuda et al. |
| 6,048,376 | A | * | 4/2000 | Miller ........................ 55/320 |

FOREIGN PATENT DOCUMENTS

DE 19754612 A1 * 6/1998

* cited by examiner

*Primary Examiner*—Robert A. Hopkins
(74) *Attorney, Agent, or Firm*—Brinks Hofer Gilson & Lione (57) ABSTRACT

The present invention relates to an oil separator for separating oil from a gaseous medium discharged by a compressor. The oil separator includes an inlet for communication with the discharge outlet of a compressor, and first and second outlets. The first outlet allows separated refrigerant to escape the oil separator, and the second outlet allows separated oil to escape the oil separator. A tortuous path lies between the inlet and a first outlet, and is comprised of one or more enlarged regions and one or more narrow regions that are angularly situated with each other. The walls of the tortuous path provide surfaces on which the oil contained within the gaseous medium can be impinged, and thereby separated from the gaseous medium. The oil separator may also include a collection chamber and drainage pathways that communicate with the tortuous path. The oil separator can be a separate body that is attached to a compressor, or may be integrally formed by a housing of a compressor.

16 Claims, 4 Drawing Sheets

OIL SEPARATOR HAVING A TORTUOUS PATH DISPOSED BETWEEN AN INLET AND FIRST OUTLET

FIELD OF THE INVENTION

The present invention relates to an oil separator that separates suspended oil from a gaseous medium. More specifically, the invention relates to an oil separator that achieves oil separation via impingement.

BACKGROUND OF THE INVENTION

In compressors typically used in refrigeration and air conditioning systems, such as swashplate type compressors, a mist containing lubricating oil suspended in the gaseous refrigerant medium is often output from the compressor. That is, the high pressure refrigerant expelled by operation of the compressor frequently comprises a mist containing droplets of oil used to lubricate the moving parts of the compressor. Due to differences in various physical properties between the oil and the refrigerant, any oil that remains suspended in the refrigerant as it travels throughout the refrigeration circuit can reduce the performance of the compressor and refrigeration system. For example, by reducing oil available to the moving parts of the compressor, the compressor is susceptible to increased wear and seizure potential.

To combat these problems, an oil separator can be added to the refrigeration circuit, and is typically positioned between the compressor outlet and condenser inlet. The oil separator functions to separate the suspended oil from the gaseous refrigerant. Considering the potential effects of oil being gradually removed from the compressor due to its suspension in the refrigerant output, there is a need to improve the state of the oil compressor art.

SUMMARY OF THE INVENTION

The present invention provides an oil separator that comprises an inlet, a first outlet, a second outlet, and an interior chamber defining a tortuous path between the inlet and first outlet. The tortuous path includes at least one enlarged region and at least one narrow region in communication with each other and angularly oriented towards each other. The enlarged region provides a first wall suitable for impingement by a gaseous medium containing suspended oil. The narrow region provides a second wall suitable for the same purpose. The oil separator may further include a collection chamber and drainage pathways.

DETAILED DESCRIPTION OF THE PREFERRED EMBODIMENTS

The following description of two preferred embodiments provides a detailed description of the invention. The embodiments discussed herein are exemplary in nature, and are not intended to limit the scope of the invention in any manner. Rather, the description serves to enable any person skilled in the art of oil separators to make and use the present invention.

As used herein, the term "impingement" refers to the removal of suspended liquid droplets from a flowing stream of gas or vapor by a collision between the stream and a solid surface. The collision forces the droplets to fall away from the stream.

Figure 1:
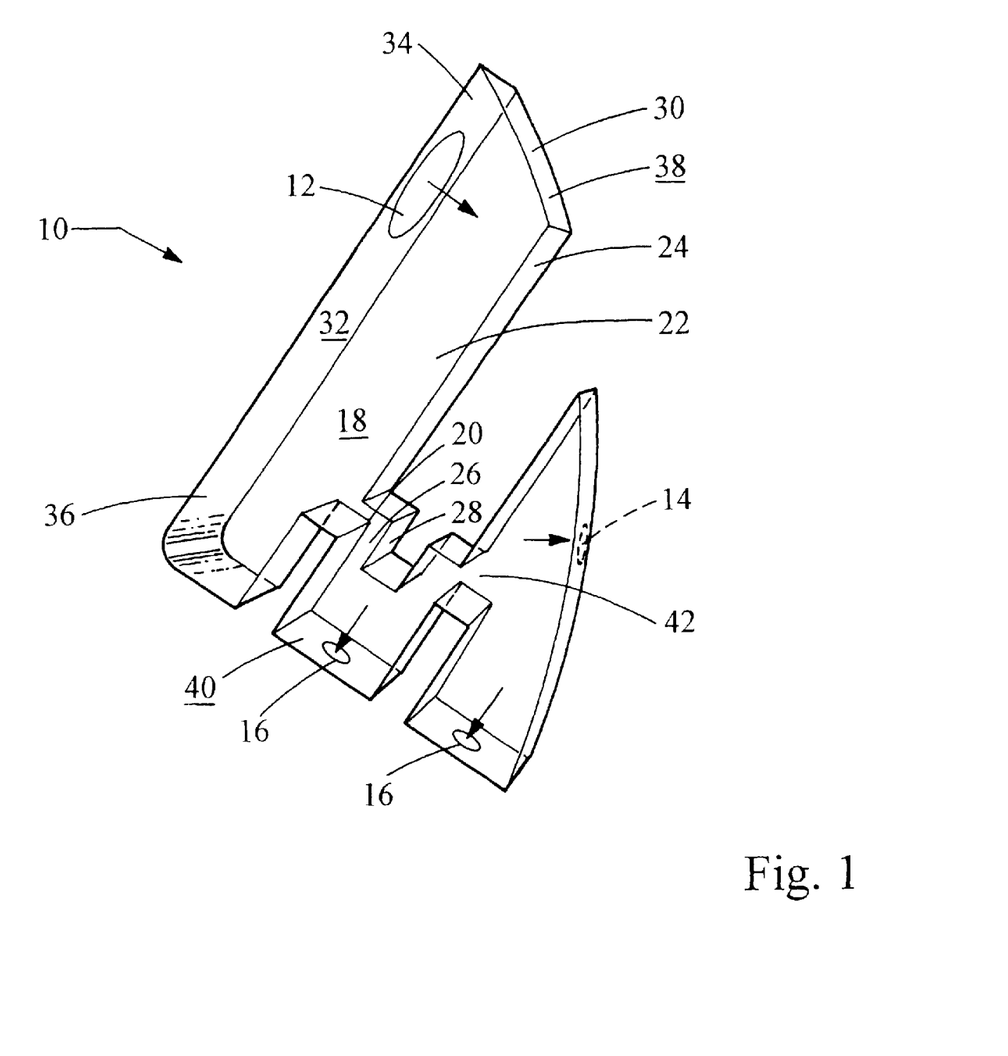
FIG. 1 is a perspective view of an oil separator in accordance with a first preferred embodiment of the present invention.
Figure 2:
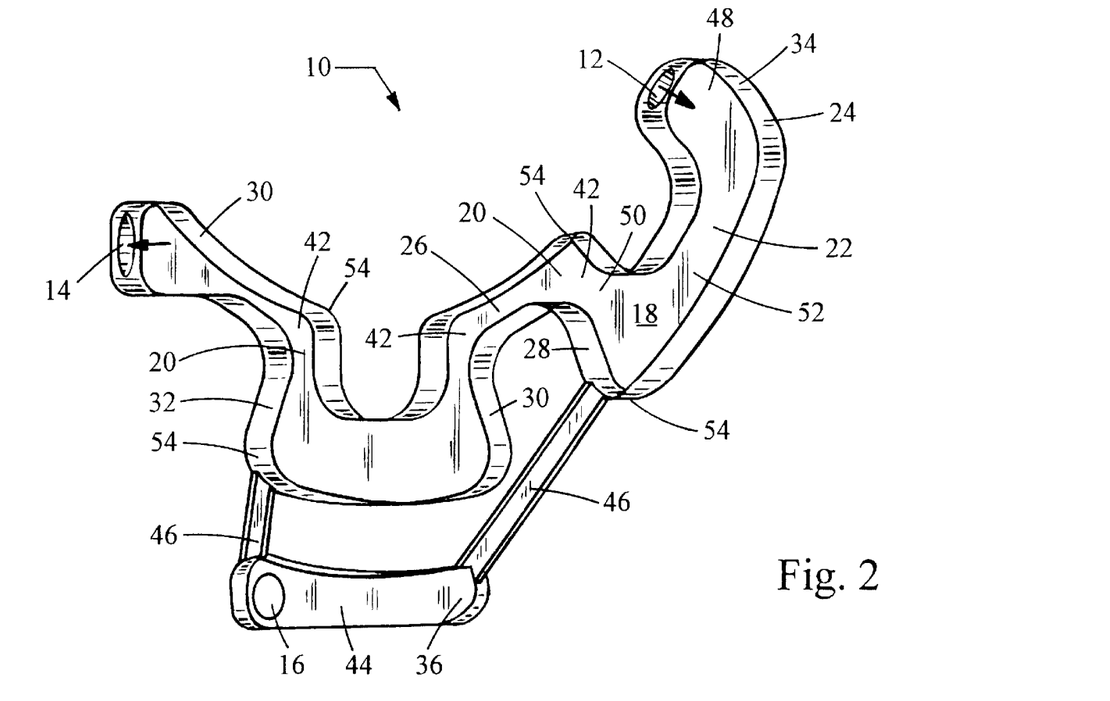
FIG. 2 is a perspective view, partially broken away, of an oil separator in accordance with a second preferred embodiment of the present invention.

FIGS. 1 and 2 illustrate two preferred embodiments of the oil separator of the present invention. The present invention provides an oil separator, generally indicated in the figures at reference 10. The oil separator 10 comprises an inlet 12, a first outlet 14, a second outlet 16, and an interior chamber 18 defining a tortuous path 20 between the inlet 12 and the first outlet 14. The interior chamber 18 defines a plurality of regions that form the tortuous path 20. The tortuous path 20 includes an enlarged region 22 that provides a first impingement surface 24, and a narrow region 26 that provides a second impingement surface 28.

The oil separator 10 has an exterior surface 30, an interior surface 32, an upper end 34 and a lower end 36. An upper wall 38 closes the upper end 34 of the oil separator 10, and a lower wall 40 closes the lower end 36.

FIG. 1 illustrates a first preferred embodiment of the oil separator 10 in accordance with the present invention. The inlet 12 is a communicative passageway that provides communication between the exterior of the oil separator and the interior chamber 18. The inlet 12 is adapted to communicate with the discharge outlet of the compressor to which the oil separator 10 is attached. The inlet 12 functions to provide a passageway by which a gaseous medium containing suspended oil that is discharged from the compressor can enter the oil separator 10. Preferably, the inlet 12 comprises an aperture on the exterior surface 30 of the oil separator 10. Alternatively, the inlet 12 can comprise a tubular member that traverses the exterior surface 30. Also alternatively, the inlet 12 can take any other form of communicative passageway suitable for providing access to the interior chamber 18 of the oil separator 10. Ultimately, the size, shape and form of the inlet 12 will depend on the same characteristics of the discharge outlet of the compressor.

Preferably, the inlet 12 is located on the exterior surface 30 near the upper end 34 of the oil separator 10. This arrangement maximizes the interior surface 32 of the oil separator 10 available for impingement. Alternatively, the inlet 12 can be located anywhere along the exterior surface 30 of the oil separator 10.

The first outlet 14 comprises a communicative passageway that provides communication between the interior chamber 18 of the oil separator 10 and the external environment. The first outlet 14 provides an escape passageway by which separated gaseous medium, such as refrigerant, can leave the oil separator 10. Similar to the inlet 12, the first outlet 14 preferably comprises an aperture on the exterior surface 30 of the oil separator 10. Alternatively, the first outlet 14 can comprise a tubular member that traverses the exterior surface 30, or can be any other form of communicative passageway suitable for providing the escape passageway for the gaseous medium.

As illustrated in FIG. 1, the first outlet 14 is preferably positioned opposite from the inlet 12. This arrangement maximizes the length of the tortuous path 20, thereby maximizing the separation capability of the oil separator 10. Alternatively, the first outlet 14 can be located anywhere on the exterior surface 30 of the oil separator 10, so long as the tortuous path 20 is formed between the inlet 12 and first outlet 14. Also as shown in FIG. 1, it is preferred that the first outlet 14 is positioned near the upper end 34 of the oil separator 10. Similar to the preferred positioning of the inlet 12, this arrangement of the first outlet 14 maximizes the interior surface 32 of the oil separator 10 available for impingement.

The second outlet 16 is a communicative passageway that provides communication between the interior chamber 18 of the oil separator 10 and the exterior environment. The second outlet 16 functions to provide an escape passageway by which separated oil can leave the oil separator 10. As such, the second outlet 16 is preferably positioned on the lower end 36 of the oil separator. Particularly preferred, as illustrated in FIG. 1 the second outlet 16 is located on the lower wall 40. This positioning assures that the second outlet 16 is at the bottom of the oil separator 10.

Similar to the inlet 12 and first outlet 14, the second outlet 16 preferably comprises an aperture on the exterior surface 30 of the oil separator 10. Alternatively, the second outlet 16 can comprise a tubular member that traverses the exterior surface 30 of the oil separator. Also, the second outlet 16 may be any other form of communicative passageway suitable for providing an escape passageway for separated oil. The size, shape, and form of the second outlet 16 will depend on the oil return inlet or passageway of the compressor to which the oil separator 10 is attached.

As illustrated in FIG. 1, the second outlet 16 preferably comprises two or more independent apertures located on the oil separator 10 in accordance with the preferences and alternatives listed above. Alternatively, as illustrated in FIG. 2, the second outlet 16 may comprise a single aperture positioned on the oil separator in accordance with those preferences and alternatives. The use of multiple apertures for the second outlet 16 maximizes the ability of the oil separator 10 to drain separated oil from the interior chamber 18.

The tortuous path 20 comprises a pathway defined by one or more bends or turns 42 that force a change in direction as gaseous medium flows through the interior chamber 18 of the oil separator 10. The tortuous path 20 functions to force impingement of the oil suspended in the gaseous medium on the impingement surfaces 24, 28 provided by the walls defining the path 20.

Preferably, as shown in FIGS. 1 and 2, the tortuous path 20 includes a series of enlarged 22 and narrow 26 regions in communication with each other. Alternatively, a single enlarged region 22 with a single narrow region 26 can comprise the tortuous path 20. To ensure the change in direction of flow, it is preferred that the enlarged 22 and narrow 26 regions are angled with respect to each other. A substantially orthogonal arrangement of the regions 22, 26 is particularly preferred. Essentially any angular relationship may be used, however, so long as it provides the impingement surfaces 24, 28. Lastly, it is preferred that the enlarged regions 22 are positioned within the oil separator 10 such that oil adhering to the interior surface 32 drains downward toward the lower end 36 following impingement on the impingement surfaces 24, 28.

The enlarged region 22 provides a communicative passageway within the interior chamber 18. Preferably, as shown in FIGS. 1 and 2, the first region of the tortuous pathway 20 comprises an enlarged region 22. That is, the region of the tortuous path 20 that is adjacent the inlet 12 preferably comprises an enlarged region 22. The enlarged region 22 provides a larger volume than the area or region adjacent the enlarged region 22. Also, the enlarged region 22 is preferably positioned such that it provides a first impingement surface 24. Also preferably, the enlarged region 22 is angled with respect to the inlet 12. The enlarged region 22 functions to reduce velocity of the gaseous medium flowing through the oil separator 10, thereby reducing the capacity of the medium to hold oil. This is accomplished due to the relatively large volume of the enlarged region 22. Also, the enlarged region 26 comprises a communicative passageway within the interior chamber 18 of the oil separator 10, and defines a portion of the tortuous path 20.

The narrow region 26 facilitates separation of oil from gaseous medium within the oil separator 10 by imparting a lower pressure onto the gaseous medium, thereby reducing the ability of the medium to hold oil. Also, the narrow region 26, due to its reduced volume relative to the enlarged region 22, forces an acceleration of the gaseous medium while in the narrow region 26. This acceleration results in more forceful impingement as the medium travels through the narrow region 26.

Preferably, the narrow region is angled with respect to the adjacent regions of the tortuous path 20. In this position, the narrow region provides a wall available as a second impingement surface 28 for gaseous medium leaving the enlarged region 22 and traveling through the narrow region 26. It is preferred that the narrow region 26 is substantially perpendicular to the axis of the enlarged region 22. Alternatively, any angular relationship that allows impingement on the second impingement surface 28 may be employed.

FIG. 2 illustrates a second preferred embodiment of the oil separator 10 according to the present invention. Except as noted below, the oil separator 10 of the second preferred embodiment is similar to the oil separator 10 of the first preferred embodiment, as detailed above.

In this embodiment, the inlet 12 preferably comprises a tubular shaped passageway that allows communication between the discharge outlet of the compressor and the interior chamber 18. Alternatively, and similar to the first preferred embodiment, the inlet 12 may comprise an aperture in the exterior surface 30 of the oil separator 10.

In this embodiment, the first outlet 14 preferably comprises a tubular shaped passageway that allows communication between the remainder of the refrigeration and/or cooling circuit and the interior chamber 18 of the oil separator 10. Alternatively, similar to the first preferred embodiment, the first outlet 14 may also comprise an aperture in the exterior surface 30 of the oil separator 10.

In this embodiment, as shown in FIG. 2, the oil separator further comprises a collection chamber 44 and at least one drainage pathway 46. The collection chamber comprises a hollow structure defining a cavity capable of containing a quantity of separated oil. The collection chamber 44 receives oil from the tortuous path 20 and allows the oil to exit from the oil separator 10 through the second outlet 16. As such, the collection chamber 44 is preferably positioned below the tortuous path 20. That is, it is preferred that the collection chamber 44 be positioned relative to the tortuous path 20 such that gravity forces lubricating oil that has collected in the tortuous path 20, or a portion thereof, to move toward the collection chamber 44.

Preferably, the collection chamber 44 comprises a simple flow through chamber. That is, the collection chamber 44 is preferably a hollow chamber that communicates with the tortuous path 20 and the second outlet 16. Alternatively, the collection chamber 44 can be a regulated chamber, including various electronic or mechanical means to control the influx and efflux of separated oil.

The drainage pathway 46 comprises a communicative passageway that provides communication between the tortuous path 20 and the collection chamber 44. The drainage pathway 46 provides the passageway by which separated oil leaves the tortuous path 20 and enters the collection chamber 44. Thus, the drainage pathway 46 functions to deliver oil from a point on the tortuous path 20 to the collection chamber 44. Preferably, the drainage pathway comprises a tubular passageway and traverses the exterior surface 30 of the oil separator 10 at a low point of a region of the tortuous path 20. Particularly preferred, the drainage pathway 46 traverses the exterior surface 30 at a low point of an enlarged region 22. More preferred, the drainage pathway 46 traverses the exterior surface 30 at the lowest point of an enlarged region, i.e., the point at which gravity forces separated oil to pool within the enlarged region 22. This configuration ensures maximum removal of oil from the tortuous path 20.

Preferably, the oil separator 10 of the second preferred embodiment includes one drainage pathway 46. Alternatively, as illustrated in FIG. 2, the oil separator 10 can include multiple drainage pathways 46. In this embodiment, it is preferred that one drainage pathway 46 traverses the exterior surface 30 at the lowest point of each of the enlarged regions 22 of the tortuous path 20. This arrangement ensures efficient drainage of separated oil from the oil separator 10.

In the second preferred embodiment, the second outlet 16 comprises a tubular shaped passageway that allows communication between the oil return inlet or passageway of the compressor and the collection chamber 44 of the oil separator 10. Alternatively, if the collection chamber 44 is not present, the second outlet 16 may provide communication between the oil return inlet or passageway of the compressor and the interior chamber 18 of the oil separator 10. Also alternatively, similar to the first preferred embodiment, the second outlet 16 may comprise an aperture in the exterior surface 30.

The tortuous path 20 of the second preferred embodiment is similar to that of the first preferred embodiment in that it includes an enlarged region 22 and a narrow region 26. While the function of these regions 22, 26 remain the same as in the first preferred embodiment, their structures differ from those discussed above. In this embodiment, the enlarged region 22 preferably comprises a section substantially U-shaped in form. Thus, the enlarged region 22 of this embodiment includes a first arm 48, and second arm 50 and a base 52. The U-shaped configuration provides additional turns 42 to the tortuous path 20, thereby increasing impingement, and, in turn, separation of oil. As shown in FIG. 2, it is preferred that the first region of the tortuous path 20 of this embodiment, similar to the first preferred embodiment, comprise an enlarged region 22. Also preferred, the inlet 12 traverses the exterior surface 30 at the top of the first arm 48 of the enlarged region 22. This arrangement assures impingement on the interior surface 32 of the oil separator 10 at the base 52 of the enlarged region 22.

The narrow region 26 of this preferred embodiment comprises a communicative passageway that allows communication with at least one enlarged region 22. Preferably, the narrow region 26 provides communication between the second arm 50 of a first enlarged region 22 and the first arm 48 of a second enlarged region 22. Alternatively, the narrow region 26 may provide communication between the second arm 50 of an enlarged region 22 and the first outlet 14. The oil separator 10 shown in FIG. 2 includes one narrow region 26 of the preferred arrangement and a second narrow region 26 in accordance with the alternate arrangement.

Similar to the first preferred embodiment, both the enlarged 22 and narrow 26 regions of the second preferred embodiment are preferably angulated with respect to each other. It will be appreciated that the angular relationship of these regions 22, 26 does not mandate that each region define 90° corners. Indeed, as illustrated in FIG. 2, it is preferred in this embodiment that the regions 22, 26 define rounded corners 54. These rounded corners 54 direct the flow of gaseous medium towards the interior surface 32 and the impingement surfaces 24, 28 for impingement, thereby facilitating separation of oil by impingement.

Figure 3:
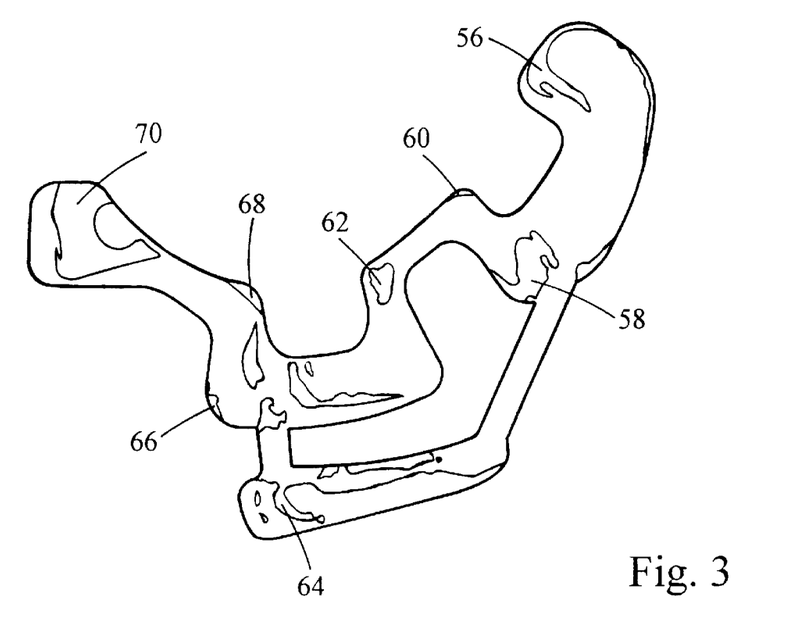
FIG. 3 is a schematic representation of data representing contours of oil concentration on the interior surface of an oil separator in accordance with a second preferred embodiment of the present invention.

FIG. 3 illustrates results of two phase modeling based on computational fluid dynamics using the physical properties of refrigerant, oil and the second preferred embodiment of the present invention. As shown in the figure, the results predict that the structure of the second preferred embodiment produces a plurality of regions (indicated at references 56–70, even numbers) of high concentration (70–100%) of oil on the interior surface 32 of the oil separator 10. The preferred embodiment shown in FIG. 2 produces eight distinct areas of high oil concentration, each of which results in the flow of oil that has adhered to the impingement surfaces 24, 28 to the nearest drainage pathway 46 due to the orientation of the interior surface 32 and the tortuous path 20.

The oil separator 10 of the present invention is particularly well suited for incorporation into compressors in refrigeration circuits, such as swashplate type compressors. These compressors and circuits are known in the art, and will not be described in detail herein. Exemplary swashplate compressors are described in the following U.S. Patents, each of which are hereby incorporated by reference in their entirety: U.S. Pat. No. 4,996,841 to Meijer et al. for a STIRLING CYCLE HEAT PUMP FOR HEATING AND/ OR COOLING SYSTEMS, U.S. Pat. No. 5,816,134 to Takenaka et al. for COMPRESSOR PISTON AND PISTON TYPE COMPRESSOR, and U.S. Pat. No. 5,921,756 to Matsuda et al. for a SWASHPLATE COMPRESSOR INCLUDING DOUBLE-HEADED PISTONS HAVING PISTON SECTIONS WITH DIFFERENT CROSS-SECTIONAL AREAS.

Figure 4:
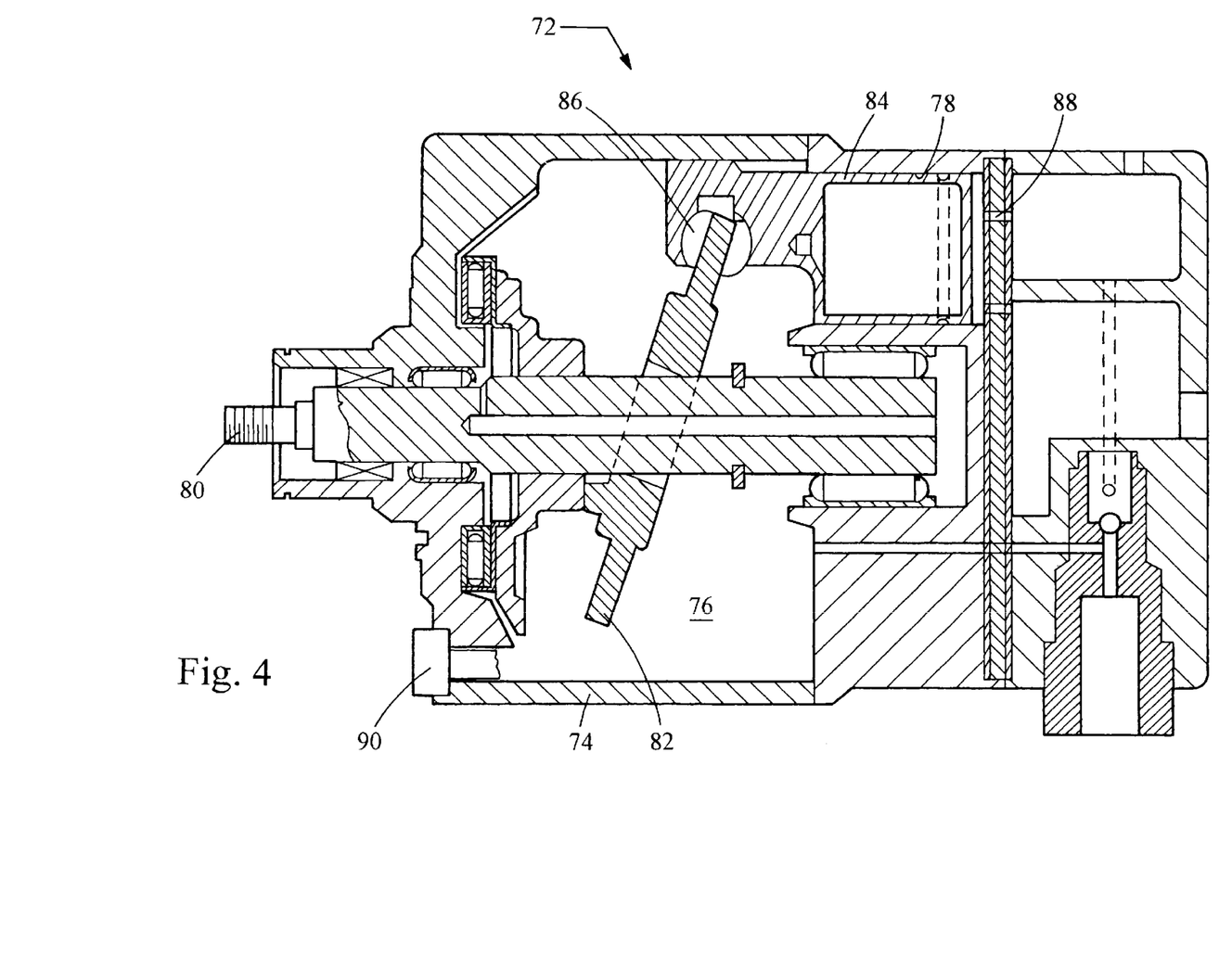
FIG. 4 is a cross-sectional view of a swashplate type compressor.

Briefly, as illustrated in FIG. 4, a swashplate type compressor 72 comprises a housing 74 that defines a swashplate chamber 76 and at least one cylinder bore 78. A rotatable driveshaft 80 passes through the housing 74 and into the swashplate chamber 76. The swashplate 82 is fixedly attached to the end of the shaft 80 at an angle within the chamber 76. A piston 84 is positioned in the cylinder bore 78 and, via shoes 86, is operably connected to the swashplate 82 such that the rotational movement of the shaft 80 and connected swashplate 82 forces the piston 84 to reciprocate in a linear fashion within the cylinder bore 78. This reciprocating movement of the piston 84 results in the compression of gas contained within the cylinder bore 78 as the piston 84 moves between a top dead center position and bottom dead center position. A discharge outlet 88 is in communication with the cylinder bore 78 such that the compressed gas is forced into the discharge outlet 88 and can be moved into the remainder of a refrigeration circuit. Also, the compressor 72 includes an oil return inlet 90 for returning lubricating oil to the swashplate chamber 76 such that it is available for lubricating the moving parts located within the swashplate chamber 76.

These compressors are typically placed in communication with various communicative passageways and heat exchangers to form a refrigeration circuit.

Figure 5:
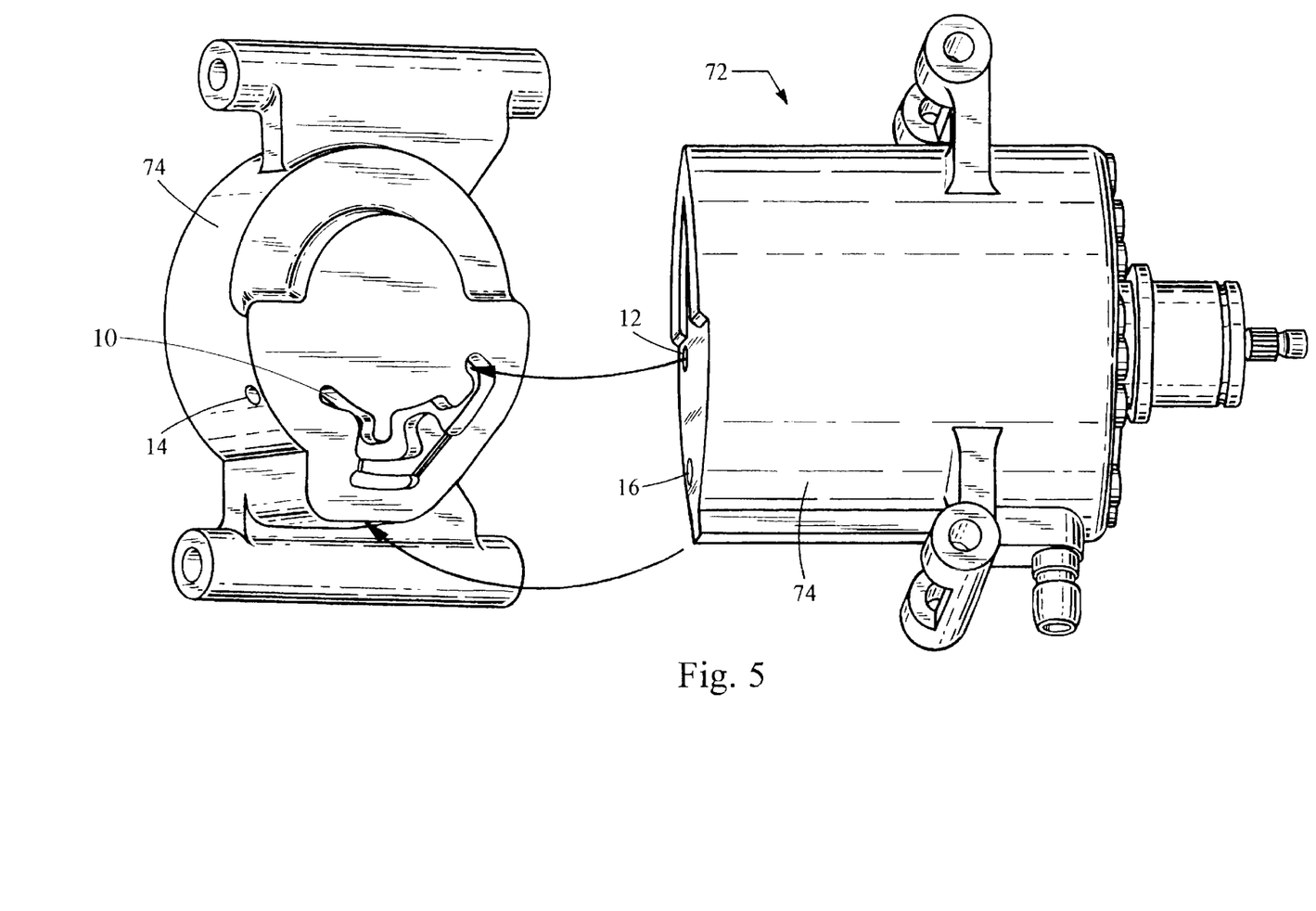
FIG. 5 is a perspective view of a swashplate type compressor that includes an oil separator in accordance with the present invention.

As illustrated in FIG. 5, the oil separator 10 of the present invention can easily be incorporated into a swashplate type compressor 72 by placing the inlet 12 in communication with the discharge outlet 82 and the second outlet 16 in communication with the oil return inlet 90. Also, the first outlet 14 can be connected to the remainder of the refrigeration circuit such that the refrigerant, after being separated from the oil, can be moved into the remainder of the circuit. In this fashion, a mist containing oil suspended in a gaseous refrigerant leaves the compressor 72 through the discharge outlet 88 and enters the oil separator 10 through the inlet 12. While in the oil separator 10, the oil travels through the tortuous path 20, impacting the interior surface 32 via impingement and therefore gradually becoming separated from the refrigerant. The refrigerant leaves the oil separator 10 through the first outlet 14 and is able to travel through the rest of the refrigeration circuit. The oil gradually leaves the oil separator 10 through the second outlet 16, and returns to the compressor 72 through the oil return inlet 90.

The oil separator 10 of the present invention can be formed from steel, aluminum, or any other suitable material by standard techniques, such as stamping and welding, and secured to the compressor 72 with appropriate connections being made to the inlet 12, first outlet 14 and second outlet 16.

Preferably, however, the oil separator 10 of the present invention can be integrally formed by the compressor housing 74. In this embodiment, as illustrated in FIG. 5, the oil separator 10 is machined into the housing 74 of the compressor 72. The communicative passageways between the compressor 72 and the inlet 12, first outlet 14 and second outlet 16 can also be integrally formed by the housing 74. Alternatively, these communicative passageways 12, 14, 16 can comprise separately attached members.

The foregoing disclosure is the best mode devised by the inventors for practicing the invention. It is apparent, however, that several variations in the oil separator art in accordance with the present invention may be obvious to one skilled in the art. Inasmuch as the foregoing disclosure is intended to enable one skilled in the pertinent art to practice the instant invention, it should not be construed to be limited thereby, but should be construed to include such aforementioned obvious variations. As such, the present invention should be limited only by the spirit and scope of the following claims.

We claim:

1. An oil separator for use with compressor outputting lubricating oil suspended in a gaseous medium, said oil separator comprising:
    an inlet;
    a first outlet;
    a second outlet;
    a housing having an interior surface, an exterior surface, and an interior chamber, the interior and exterior surfaces cooperating to define a tortuous path between the inlet and the first outlet, the tortuous path including an enlarged region having a first wall angled with respect to the inlet; and
    a narrow region in communication with the enlarged region, the narrow region having a second wall angled with respect to the enlarged region;
    wherein said lubricating oil suspended in a gaseous medium leaves said compressor and enters said oil separator through the inlet and said lubricating oil is separated from said gaseous medium due to impingement of said lubricating oil upon the first and second walls.

2. An oil separator in accordance with claim 1, further comprising a collection chamber and a communicative passageway, wherein the collection chamber is positioned below the tortuous path, such that gravity forces said lubricating oil within the tortuous path to move toward the collection chamber, and wherein the communicative passageway provides fluid communication between the tortuous path and the collection chamber.

3. An oil separator in accordance with claim 2, wherein the second outlet is disposed on the collection chamber.

4. An oil separator in accordance with claim 2, wherein the communicative passageway is in communication with the enlarged region.

5. An oil separator in accordance with claim 4, wherein the communicative passageway traverses the enlarged region at the lowest point of the enlarged region.

6. An oil separator in accordance with claim 1, wherein the tortuous path further includes a second enlarged region having a third wall angled with respect to the narrow region.

7. An oil separator in accordance with claim 6, wherein the tortuous path further includes a second narrow region having a fourth wall angled with respect to the second enlarged region.

8. An oil separator for use with compressor outputting lubricating oil suspended in a gaseous medium, said oil separator comprising:
    an inlet;
    a first outlet;
    a second outlet;
    an interior chamber defining a tortuous path between the inlet and the first outlet, the tortuous path including an enlarged region having a first wall angled with respect to the inlet; and
    a narrow region in communication with the enlarged region, the narrow region having a second wall angled with respect to the enlarged region;
    wherein said lubricating oil suspended in a gaseous medium leaves said compressor and enters said oil separator through the inlet and said lubricating oil is separated from said gaseous medium due to impingement of said lubricating oil upon the first and second walls;
    wherein the enlarged region is substantially U-shaped.

9. An oil separator for use with compressor outputting lubricating oil suspended in a gaseous medium, said oil separator comprising:
    an inlet;
    a first outlet;
    a second outlet;
    an interior chamber defining a tortuous path between the inlet and the first outlet, the tortuous path including an enlarged region having a first wall angled with respect to the inlet; and
    a narrow region in communication with the enlarged region, the narrow region having a second wall angled with respect to the enlarged region;
    wherein said lubricating oil suspended in a gaseous medium leaves said compressor and enters said oil separator through the inlet and said lubricating oil is separated from said gaseous medium due to impingement of said lubricating oil upon the first and second walls; and wherein the torturous path further includes a second enlarged region having a third wall angled with respect to the narrow region;

further comprising a collection chamber and first and second communicative passageways, wherein the collection chamber is positioned below the torturous path such that gravity forces said lubricating oil within the torturous path to move toward the collection chamber, and wherein the first and second communicative passageways provide fluid communication between the torturous path and the collection chamber.

10. An oil separator in accordance with claim 9, wherein at least one of the communicative passageways is in communication with one of the first and second enlarged regions.

11. An oil separator in accordance with claim 10, wherein at least one of the communicative passageways traverses the enlarged region at the lowest point of the enlarged region.

12. An oil separator in accordance with claim 9, wherein the first and second communicative passageways are in independent communication with the first and second enlarged regions.

13. A swashplate-type compressor, comprising:

a housing defining a swashplate chamber and at least one axially extending cylinder bore;

a rotatable shaft supported by the housing and having an axis and first and second ends, the first end being external to the housing and the second end being disposed within the swashplate chamber;

a swashplate disposed on the second end of the shaft and within the chamber, the swashplate being fixedly mounted to the shaft at an angle to the axis of the rotatable shaft;

a piston disposed in the cylinder bore and operably connected to the swashplate such that the rotational movement of the shaft and connected swashplate is transformed to linear reciprocating movement of the piston within the cylinder bore;

a discharge outlet in communication with the cylinder bore such that compressed gas within the cylinder bore produced by the reciprocating movement of the piston is forced into the discharge outlet;

an oil return inlet for returning lubricating oil to the swashplate chamber of said compressor; and an oil separator comprising an inlet in communication with the discharge outlet of said compressor, a first outlet in communication with the oil return inlet of the compressor, a second outlet in communication with the oil return inlet of the compressor, a housing having an interior surface, an exterior surface, and an interior chamber, the interior and exterior surfaces cooperating to define a torturous path between the inlet and the first outlet, the torturous path including an enlarged region having a first wall angled with respect to the inlet and a narrow region in communication with the enlarged region and having a second wall angled with respect to the enlarged region;

wherein said compressor outputs lubricating oil suspended in a gaseous medium through the discharge outlet, the lubricating oil suspended in a gaseous medium enters the oil separator through the inlet, travels through the torturous path and impinges on the first and second walls, and wherein lubricating oil is separated from the gaseous medium by such impingement, exits the oil separator through the second outlet and returns to the compressor through the oil return inlet.

14. A compressor in accordance with claim 13, further comprising a collection chamber and a communicative passageway, wherein the collection chamber is positioned below the torturous path, such that gravity forces said lubricating oil within the torturous path to move toward the collection chamber, and wherein the communicative passageway provides fluid communication between the tortuous path and the collection chamber.

15. A compressor in accordance with claim 14 wherein the second outlet is disposed on the collection chamber.

16. A swashplate-type compressor, comprising:

a housing defining a swashplate chamber and at least one axially extending cylinder bore;

a rotatable shaft supported by the housing and having an axis and first and second ends, the first end being external to the housing and the second end being disposed within the swashplate chamber;

a swashplate disposed on the second end of the shaft and within the chamber, the swashplate being fixedly mounted to the shaft at an angle to the axis of the rotatable shaft;

a piston disposed in the cylinder bore and operably connected to the swashplate such that the rotational movement of the shaft and connected swashplate is transformed to linear reciprocating movement of the piston within the cylinder bore;

a discharge outlet in communication with the cylinder bore such that compressed gas within the cylinder bore produced by the reciprocating movement of the piston is forced into the discharge outlet;

an oil return inlet for returning lubricating oil to the swashplate chamber of said compressor; and an oil separator comprising an inlet in communication with the discharge outlet of said compressor, a first outlet in communication with the oil return inlet of the compressor, a second outlet, and an interior chamber defining a torturous path between the inlet and the first outlet, the torturous path including an enlarged region having a first wall angled with respect to the inlet and a narrow region in communication with the enlarged region and having a second wall angled with respect to the enlarged region;

wherein said compressor outputs lubricating oil suspended in a gaseous medium through the discharge outlet, the lubricating oil suspended in a gaseous medium enters the oil separator through the inlet, travels through the torturous path and impinges on the first and second walls, and wherein lubricating oil is separated from the gaseous medium by such impingement, exits the oil separator through the second outlet and returns to the compressor through the oil return inlet;

wherein the housing of the compressor integrally forms the oil separator.

* * * * *

UNITED STATES PATENT AND TRADEMARK OFFICE
CERTIFICATE OF CORRECTION

PATENT NO.   : 6,494,930 B2
DATED        : December 17, 2002
INVENTOR(S)  : Guntis V. Strikis et al.

It is certified that error appears in the above-identified patent and that said Letters Patent is hereby corrected as shown below:

<u>Title page,</u>
Item [75], insert -- Qadir -- after "Mirza".

Signed and Sealed this

Fifth Day of August, 2003

JAMES E. ROGAN
*Director of the United States Patent and Trademark Office*